US012608019B1

(12) United States Patent (10) Patent No.: US 12,608,019 B1

Hu et al. (45) Date of Patent: Apr. 21, 2026

(54) IN-OIL AUTONOMOUS OPERATION DETECTION ROBOT OF STORAGE TANK BOTTOM PLATE AND AUTONOMOUS OPERATION DETECTION METHOD

(71) Applicant: China Special Equipment Inspection & Research Institute, Beijing (CN)

(72) Inventors: Bin Hu, Beijing (CN); Gongtian Shen, Beijing (CN); Xinjun Wu, Beijing (CN); Zhiquan Wang, Beijing (CN); Yan Zhang, Beijing (CN); Ting Wang, Beijing (CN); Baoxuan Wang, Beijing (CN); Xiyue Zou, Beijing (CN)

(73) Assignee: China Special Equipment Inspection & Research Institute, Beijing (CN)

( * ) Notice: Subject to any disclaimer, the term of this patent is extended or adjusted under 35 U.S.C. 154(b) by 0 days.

(21) Appl. No.: 19/216,793

(22) Filed: May 23, 2025

(30) Foreign Application Priority Data

Dec. 13, 2024 (CN) ......................... 202411832737.X

(51) Int. Cl.
 *G05D 1/622* (2024.01)
 *G01B 7/06* (2006.01)
 (Continued)

(52) U.S. Cl.
 CPC .............. *G05D 1/622* (2024.01); *G01B 7/10* (2013.01); *G05D 1/648* (2024.01);
 (Continued)

(58) Field of Classification Search
 None
 See application file for complete search history.

(56) References Cited

U.S. PATENT DOCUMENTS 11,719,592 B2 * 8/2023 Walker .................... E21B 47/14
 606/21
2021/0048821 A1 * 2/2021 Bondurant ............... G05D 1/10
 (Continued)

FOREIGN PATENT DOCUMENTS

CN 111650110 A * 9/2020 ......... G01N 27/9046
CN 114441422 A * 5/2022 ........... G01N 17/006

OTHER PUBLICATIONS

Hassan et al, "Analysis of Trajectory Tracking Control Algorithms for Wheeled Mobile Robots", 2021 IEEE Industrial Electronics and Applications Conference (IEACon), Nov. 22, 2021, pp. 236-241 (Year: 2021).*

(Continued)

*Primary Examiner* — Tamara L Weber

(74) *Attorney, Agent, or Firm* — Bayramoglu Law Offices LLC

(57) ABSTRACT

An in-oil autonomous operation detection robot of a storage tank bottom plate and an autonomous operation detection method are provided. The in-oil autonomous operation detection robot of the storage tank bottom plate includes a motion module, a positioning and attitude recognition module, an obstacle avoidance module, a detection module and a control module, wherein the motion module is configured to adjust and control a motion direction, a speed and an attitude of the robot under the control of the control module; the positioning and attitude recognition module is configured to recognize a position and an attitude of the robot under the control of the control module; the obstacle avoidance module is configured to avoid obstacles under the control of the control module; and the detection module is configured to detect corrosions of the bottom plate.

5 Claims, 9 Drawing Sheets

(51) Int. Cl.
    G05D 1/648          (2024.01)
    G05D 105/80        (2024.01)
    G05D 107/50        (2024.01)
    G05D 111/50        (2024.01)

(52) U.S. Cl.
    CPC ..... *G05D 2105/89* (2024.01); *G05D 2107/50*
              (2024.01); *G05D 2111/52* (2024.01)

(56)             References Cited

U.S. PATENT DOCUMENTS

2023/0003687 A1\*   1/2023   Vaganay  ................. G01M 3/40
2025/0073897 A1\*   3/2025   Ohnishi  ............. B60W 60/001

OTHER PUBLICATIONS

Xue et al., "Spatial Trajectory Tracking of Wall-Climbing Robot on Cylindrical Tank Surface Using Backstepping Sliding-Mode Control", Micromachines 2023, 14, 548, Feb. 26, 2023, pp. 1-20 (Year: 2023).\*

\* cited by examiner

IN-OIL AUTONOMOUS OPERATION DETECTION ROBOT OF STORAGE TANK BOTTOM PLATE AND AUTONOMOUS OPERATION DETECTION METHOD

CROSS-REFERENCE TO THE RELATED APPLICATIONS

This application is based upon and claims priority to Chinese Patent Application No. 202411832737.X, filed on Dec. 13, 2024, the entire contents of which are incorporated herein by reference.

TECHNICAL FIELD

The present disclosure relates to the technical field of petrochemical industry, and in particular to an in-oil autonomous operation detection robot of a storage tank bottom plate and an autonomous operation detection method.

BACKGROUND

A large atmospheric storage tank for petroleum reserve is an important and commonly used large storage device in the petrochemical field, which is used to store various raw oil, semi-refined oil, refined oil, aromatic products and liquefied gas in the refining industry. The storage tank bottom plate is usually made by laying and welding steel plates, which plays the role of transmitting the gravity of oil and of the tank body. The outer surface of the storage tank bottom plate is in contact with the foundation, which is easy to get wet. The inner surface of the storage tank bottom plate is often in contact with the moisture and impurities deposited in oil, so that the bottom plate is easily corroded.

At present, great attention is paid to the service safety of large storage tanks. The method of opening the tank regularly for detection is usually used to ensure the safety. The main method is to open the tank for detection after unloading oil. The method of detecting magnetic flux leakage is used for the storage tank bottom plate. However, this method is expensive, inefficient, time-consuming, polluting and poor in timeliness, which seriously affects the operation and maintenance effect of the storage tank.

SUMMARY

The present disclosure aims to provide an in-oil autonomous operation detection robot of a storage tank bottom plate and an autonomous operation detection method, which can detect corrosions of the bottom plate in the invisible environment of large oil sludge, improve the detection efficiency and reduce the operation and maintenance cost.

In order to achieve the above objectives, the present disclosure provides the following solution.

On the one hand, the present disclosure provides an in-oil autonomous operation detection robot of a storage tank bottom plate (a robot for short), including a motion module, a positioning and attitude recognition module, an obstacle avoidance module, a detection module and a control module; wherein the control module is connected with the motion module, the positioning and attitude recognition module, the obstacle avoidance module and the detection module, respectively;

the motion module is configured to adjust and control a motion direction, a speed and an attitude of the robot under the control of the control module;

the positioning and attitude recognition module is configured to recognize a position and an attitude of the robot under the control of the control module;

the obstacle avoidance module is configured to avoid obstacles under the control of the control module; and the detection module is configured to detect corrosions of the bottom plate under the control of the control module; the detection module includes a detection component, a communication component and a detection control board; the detection component includes a combination of one or more of a magnetic flux leakage detection sensor, an electromagnetic acoustic detection sensor, a guided wave detection sensor and a pulsed eddy current detection sensor; the detection component and the communication component are both connected with the detection control board; the detection control board is connected with the control module via the communication component and is configured to transmit a detection result back to the control module.

Optionally, the motion module includes a wheel set and a driving motor; the wheel set is installed at both sides of long rectangular sides of the robot and includes a combination of one or more of a crawler type, a universal wheel and a Mecanum wheel; a main shaft of the wheel set is connected with the driving motor, and the wheel set is controlled by the rotation of the driving motor to adjust and control the motion direction, the speed and the attitude of the robot; the driving motor is connected with a main control board of the control module, and the main control board is controlled by an external remote controller or by an upper computer of the control module.

Optionally, the positioning and attitude recognition module includes an acoustic signal generator installed on the robot, an acoustic signal receiver installed on the tank wall and a gyroscope placed inside the robot; the positioning and attitude recognition module determines the position and the horizontal attitude of the robot via a robot positioning and attitude algorithm based on the transmitted and received acoustic signals, and calculates a pitch attitude of the robot based on the gyroscope.

Optionally, the number of the acoustic signal receivers installed on the tank wall is more than eight, at least three acoustic signal receivers are covered in each quadrant formed at an angle of 90 degrees in the circumferential direction of the tank wall, and when the robot is located in a certain quadrant, three adjacent acoustic signal receivers are used for positioning.

Optionally, the obstacle avoidance module includes a pair of acoustic signal generators and acoustic signal receivers; the acoustic signal generator transmits an acoustic signal in front of a traveling route of the robot, and when the acoustic signal meets an obstacle and returns, the returned signal is received by the signal receiver, and the distance of the obstacle is judged by a time difference between the transmission and reception of the acoustic signal; the traveling route of the robot is autonomously planned by the upper computer of the control module or is controlled by an external remote controller to avoid obstacles.

Optionally, the in-oil autonomous operation detection robot of the storage tank bottom plate further includes a dredging module; wherein the dredging module is connected with the control module and is configured to cut oil sludge on the traveling route to expose the bottom plate to be detected.

Optionally, the in-oil autonomous operation detection robot of the storage tank bottom plate further includes a retractable module; wherein the retractable module is connected with a retractable cable and is configured to put the robot on the bottom plate or retract the robot from the bottom plate.

On the other hand, the present disclosure further provides an autonomous operation detection method based on the in-oil autonomous operation detection robot of the storage tank bottom plate, including:

activating, by a control module, a positioning and attitude recognition module to recognize a position and an attitude of the robot, and adjusting the position and the attitude at the start of the autonomous operation to the predetermined position and attitude by controlling a motion module;

controlling the motion module to allow the robot to move according to an autonomously pre-planned traveling route;

if an obstacle avoidance module explores unexpected obstacles in the traveling process, planning, by the control module, an optimal route, and modifying the traveling route by controlling the motion module to avoid obstacles;

controlling the detection module to perform the required detection on the storage tank bottom plate in the traveling process, and meanwhile, transmitting a detection result back, during which the positioning and attitude recognition module continuously positions the robot to realize a one-to-one correspondence between the position information and the detection result;

completing the detection task, and returning the robot to an initial position according to a set traveling route by controlling the motion module.

Optionally, before the control module activates a positioning and attitude recognition module, the method further includes:

putting the robot into the bottom plate through the retractable module.

Optionally, controlling the detection module to perform the required detection on the storage tank bottom plate in the traveling process, and meanwhile, transmitting a detection result back, specifically includes:

turning on, by the control module in the traveling process, a magnetic flux leakage detection sensor and an electromagnetic acoustic detection sensor to perform magnetic flux leakage detection and electromagnetic acoustic thickness measurement, collecting a magnetic flux leakage detection signal and an electromagnetic acoustic thickness measurement signal as a detection result, and transmitting the detection result to the control module;

when the results of magnetic flux leakage detection and electromagnetic acoustic detection are transmitted back to the control module to show that there is no signal or a pitch angle measured by a gyroscope is greater than a threshold, turning off the magnetic flux leakage detection sensor and the electromagnetic acoustic detection sensor, activating a pulsed eddy current detection sensor to perform pulsed eddy current thickness measurement, collecting a pulsed eddy current thickness measurement signal as a detection result, and transmitting the detection result to the control module; and at a specific position or when encountering an unexpected obstacle, activating a guided wave detection sensor to perform single-point thickness measurement, deactivating other sensors, collecting a guided wave detection signal as a detection result, and transmitting the detection result to the control module.

According to the specific embodiment provided by the present disclosure, the present disclosure discloses the following technical effects.

According to the in-oil autonomous operation detection robot of the storage tank bottom plate and the autonomous operation detection method provided by the present disclosure, a motion module, a positioning and attitude recognition module, an obstacle avoidance module, a detection module and a control module which are matched with a detection module are arranged, so that the motion module can adjust and control a motion direction, a speed and an attitude of the robot under the control of the control module; the positioning and attitude recognition module can recognize a position and an attitude of the robot under the control of the control module; the obstacle avoidance module can avoid obstacles under the control of the control module; and the detection module can detect corrosions of the bottom plate under the control of the control module, which achieves the purpose of in-oil autonomous operation detection in the invisible environment of large oil sludge, has the characteristics of low cost, high efficiency, short time consumption, pollution-free, and good timeliness, greatly improves the operation and maintenance detection efficiency of the storage tank, and reduces the operation and maintenance cost.

BRIEF DESCRIPTION OF THE DRAWINGS

In order to explain the technical solution in the embodiments of the present disclosure or the prior art more clearly, the drawings needed in the embodiments will be briefly introduced hereinafter. Obviously, the drawings described below are only some embodiments of the present disclosure. Other drawings can be obtained according to these drawings without paying creative labor for those skilled in the art.

FIG. 2A and FIG. 2B are schematic structural diagrams of Embodiment 1 of an in-oil autonomous operation detection robot of a storage tank bottom plate, in which FIG. 2A is a bottom view, and FIG. 2B is a top view.

FIG. 3 A and FIG. 3B are schematic structural diagrams of Embodiment 2 of an in-oil autonomous operation detection robot of a storage tank bottom plate, in which FIG. 3A is a bottom view, and FIG. 3B is a top view.

DETAILED DESCRIPTION OF THE EMBODIMENTS

The technical solution in the embodiments of the present disclosure will be clearly and completely described with reference to the drawings hereinafter. Obviously, the described embodiments are only some embodiments of the present disclosure, rather than all of the embodiments. Based on the embodiments in the present disclosure, all other embodiments obtained by those skilled in the art without paying creative labor belong to the scope of protection of the present disclosure.

In the present disclosure, "in-oil" detection means detection "under oil or in oil", which is with respect to the traditional tank opening detection. At present, the storage tank detection method is to export the oil in the target storage tank to another storage tank, and then perform tank cleaning detection on the target storage tank. The robot of the present disclosure can directly perform autonomous operation detection in the oil without opening and cleaning the tank. In the prior art, the main method is to perform tank opening detection. The main difference between tank opening detection and in-oil detection is that the movement ability of the robot is limited due to the accumulation of a large amount of oil sludge on the bottom plate during in-oil detection, and the positioning, obstacle avoidance and navigation functions related to the conventional vision and optical detection technology are limited since the oil detection environment is the invisible environment. The existing in-oil detection robots rarely take into account the influence of the oil sludge environment. Most of the robots are limited to theoretical research or over-idealized in-oil detection robots, and do not take into account the autonomous operation detection after the robots get into the tank. In view of this, the present disclosure focuses on the problem of autonomous operation detection in the oil after the robot gets into the tank, and provides an in-oil autonomous operation detection robot of a storage tank bottom plate and an autonomous operation detection method, which have corresponding functions required for autonomous operation detection, and can detect corrosions of the bottom plate in the invisible environment of large oil sludge, improve the detection efficiency and reduce the operation and maintenance cost.

In order to enable the above objects, features and advantages of the present disclosure to be more obvious and understandable, the present disclosure will be further described in detail with reference to the drawings and the detailed description.

Figure 1:
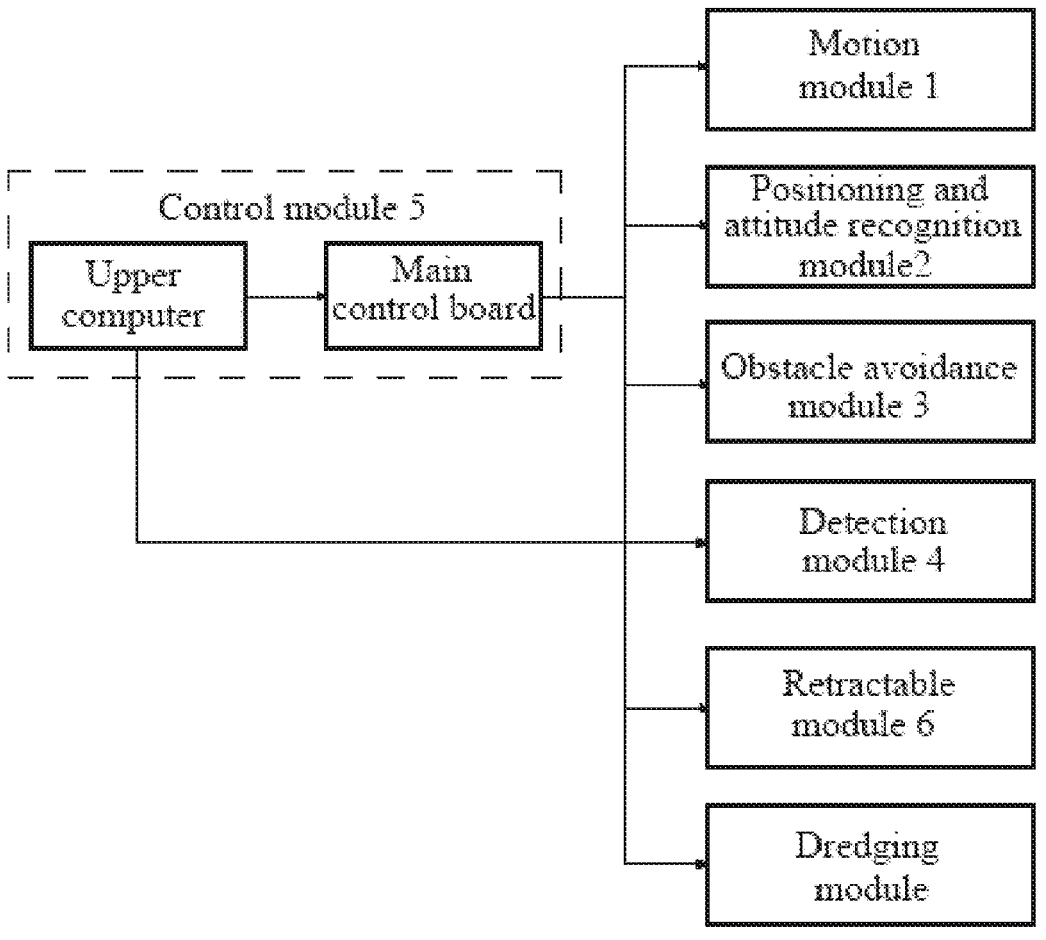
FIG. 1 is a schematic diagram of a module composition of an in-oil autonomous operation detection robot of a storage tank bottom plate.

In some embodiments, as shown in FIG. 1, the present disclosure provides an in-oil autonomous operation detection robot of a storage tank bottom plate, which mainly includes a motion module 1, a positioning and attitude recognition module 2, an obstacle avoidance module 3, a detection module 4 and a control module 5. In some embodiments, the robot can be further provided with a retractable module 6 connected with a retractable cable, and/or a dredging module 7 (depending on the situation of oil sludge), and the whole robot needs to meet the explosion-proof requirements. The control module 5 is connected with the motion module 1, the positioning and attitude recognition module 2, the obstacle avoidance module 3, the detection module 4, the retractable module 6 and the dredging module 7, respectively. The control module 5 includes an upper computer and a main control board which are connected with each other. The motion module 1 is configured to adjust and control a motion direction, a speed and an attitude of the robot under the control of the control module. The positioning and attitude recognition module 2 is configured to recognize a position and an attitude of the robot under the control of the control module. The obstacle avoidance module 3 is configured to avoid obstacles under the control of the control module. The detection module 4 is configured to detect corrosions of the bottom plate under the control of the control module. The retractable module 6 is connected with a retractable cable and is configured to put the robot into the bottom plate or retract the robot from the bottom plate. The dredging module 7 is used to cut oil sludge on the traveling route to expose the bottom plate to be detected.

Figures 2A, 2B:
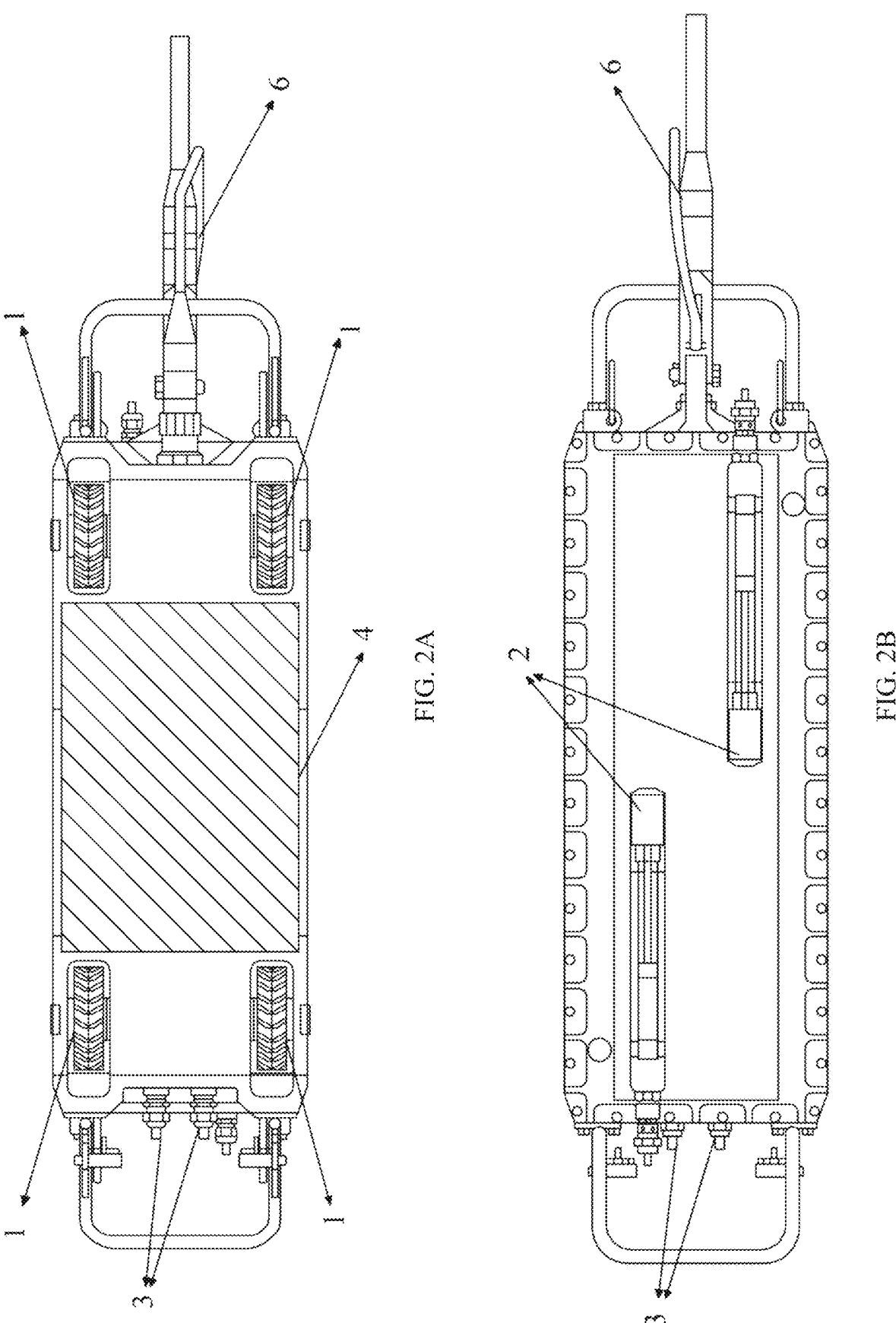
Figures 3A, 3B:
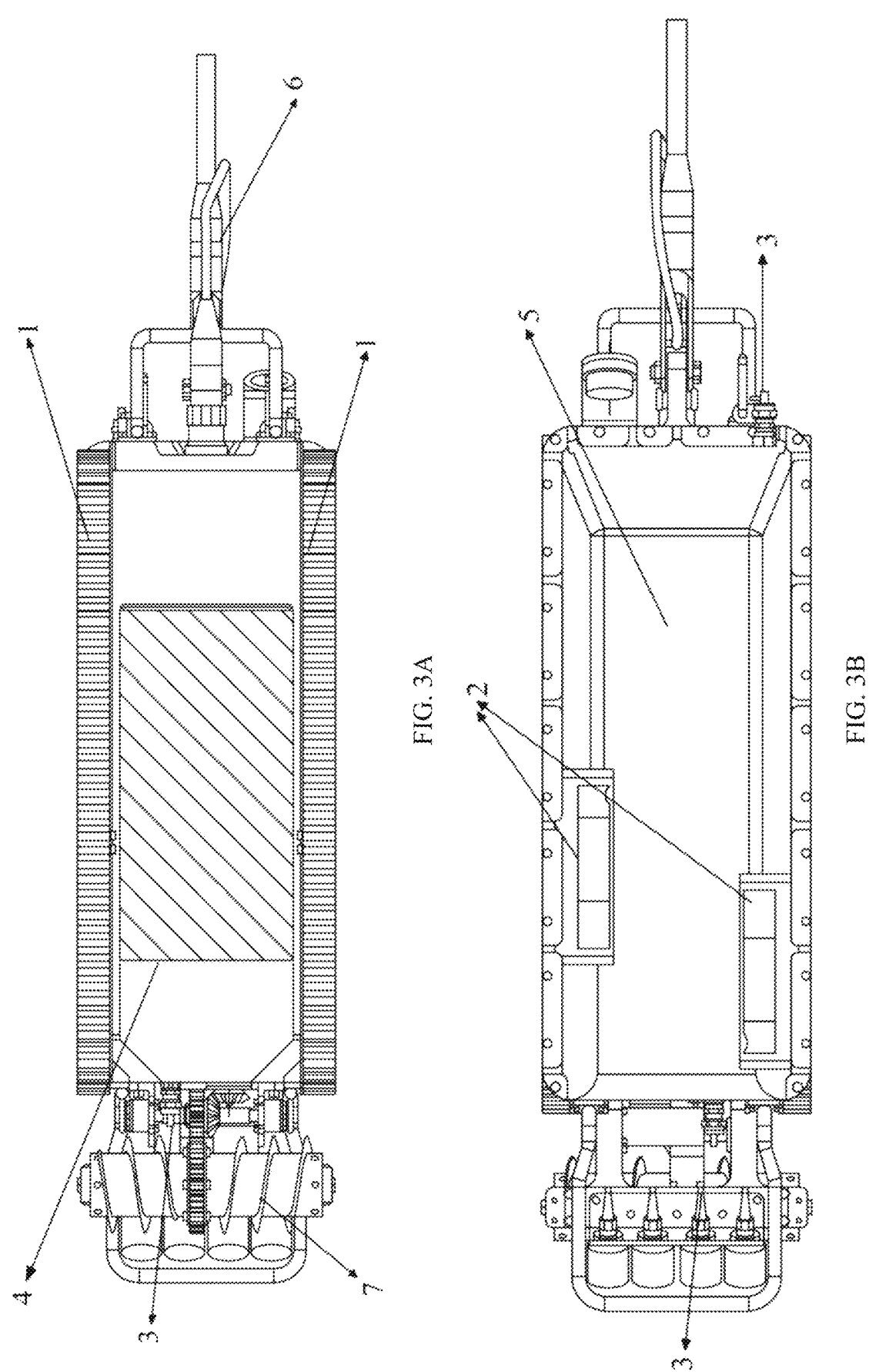

FIGS. 2A-2B and FIGS. 3A-3B show the structures of two different embodiments of an in-oil autonomous operation detection robot of a storage tank bottom plate according to the present disclosure, respectively, in which FIG. 2A and FIG. 3A are both bottom views, and FIG. 2B and FIG. 3B are both top views. Specifically, as shown in FIGS. 2A-2B and FIGS. 3A-3B, the motion module 1 includes a wheel set and a driving motor. The wheel set is installed at both sides of long rectangular sides of the robot, including but not limited to a combination of one or more of a crawler type, a universal wheel and a Mecanum wheel. A main shaft of the wheel set is connected with the driving motor, and the wheel set is controlled by the rotation of the driving motor to adjust and control the movement direction, the speed and the attitude of the robot. The driving motor is connected with a main control board of the control module 5, and the main control board can be controlled by an external remote controller or by an upper computer of the control module.

Figure 4:
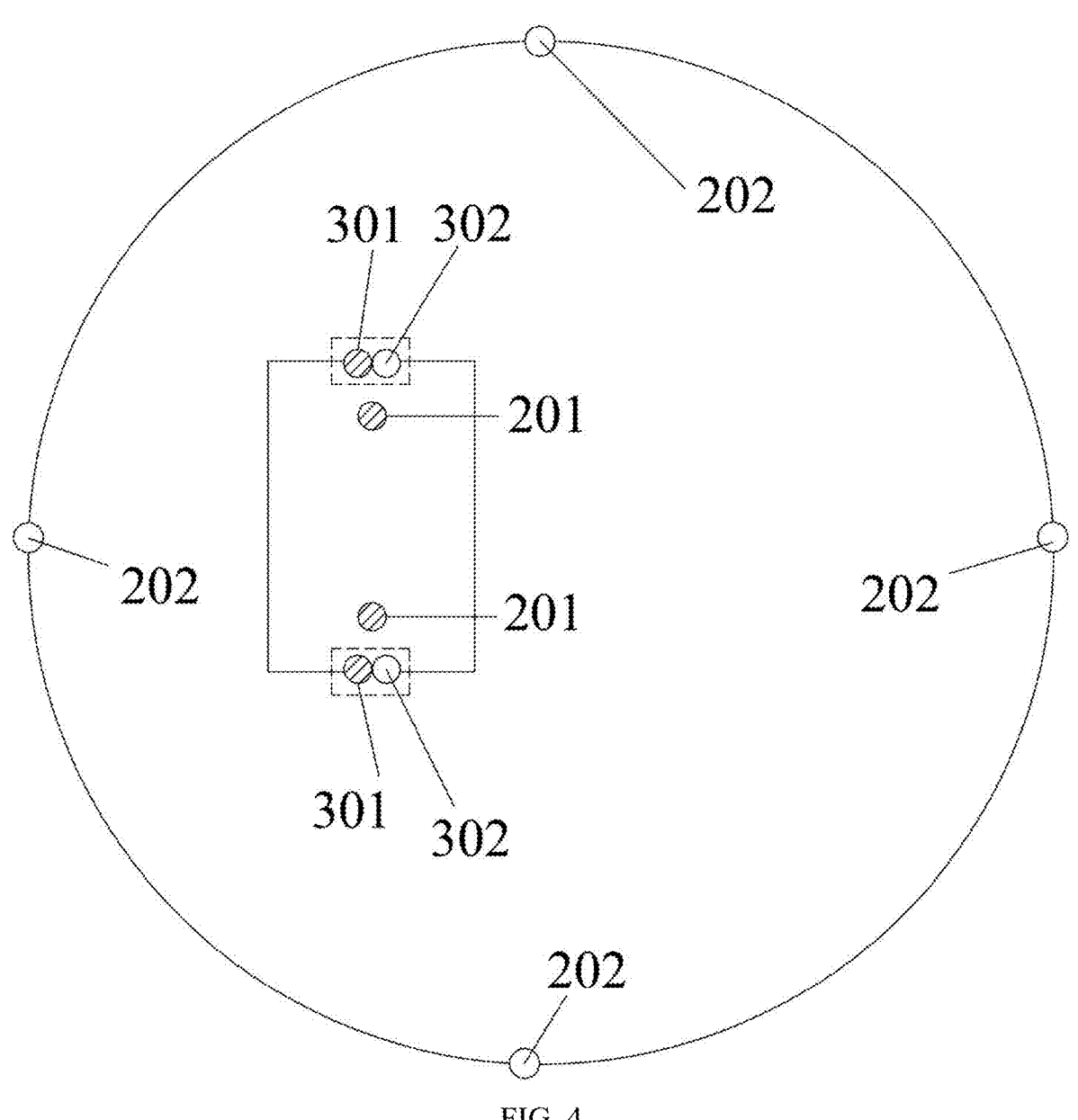
FIG. 4 is a schematic structural diagram of Embodiment 1 of a positioning and attitude recognition module.

As shown in FIG. 4, the positioning and attitude recognition module 2 includes a plurality of acoustic signal generators 201 installed on the robot, a plurality of acoustic signal receivers 202 installed on the tank wall, and a gyroscope (not shown in the figure) placed inside the robot. The positions of the plurality of acoustic signal generators 201 distributed on the robot are not overlapped with each other, but the heights thereof are the same. The plurality of acoustic signal receivers 202 are distributed in the circumferential direction on the outer wall of the storage tank. The heights of the plurality of acoustic signal receivers 202 from the ground is the same as that of the acoustic signal generators 201. The number of the acoustic signal receivers 202 installed on the tank wall is at least three. A plurality of acoustic signal receivers 202 are evenly distributed in the circumferential direction the outer wall of the storage tank. The three acoustic signal receivers 202 closest to the acoustic signal generators 201 are selected to position the acoustic source according to a three-point positioning method. The position and the horizontal attitude of the robot can be determined via a robot positioning and attitude algorithm based on the transmitted and received acoustic signals. Furthermore, a pitch attitude of the robot can be calculated based on the pitch angle data measured by the gyroscope.

Specifically, the acoustic signal generators 201 are installed on the robot, and are distributed at least in two non-overlapping positions on the robot. The installation positions can be adjusted. Different positions of the acoustic signal generators use different position and attitude calculation algorithms. For example, as shown in FIG. 4, if two acoustic signal generators 201 are located at both sides of the central point of the robot, the robot position can be acquired by connecting two positioning points during the calculation and finding the center position. The connecting direction of the two acoustic signal generators 201 can be determined as the long side direction of the robot, that is, the movement direction of the robot. If the center point of the connecting line between the two acoustic signal generators 201 is not the center position of the robot, as shown in FIGS. 2A-2B and FIGS. 3A-3B, a slightly complicated calculation process is required. The connecting line direction is not parallel to the movement direction of the robot, and a slightly complicated calculation process is also required when determining the attitude of the robot. In practical application, the above methods are feasible without affecting the position and attitude calculation of the robot. Theoretically, as long as the positions of the two acoustic signal generators 201 are not overlapped with each other, the position and attitude calculation of the robot can be performed. Actually, the farther distance between the two acoustic signal generators 201 is better. FIG. 4 shows that two acoustic signal generators are distributed along the long side on the center line of the long side. FIGS. 2A-2B and FIGS. 3A-3B are planned according to the mechanical structure design of the robot.

Specifically, two acoustic signal generators are designed to be foldable. When the positioning and attitude recognition module 2 is not operating, the acoustic signal generators are put down to reduce the height of the robot without causing obstacles to the traveling route of the robot. Therefore, in the mechanical space, there needs to be enough space to place the acoustic signal generators. Two acoustic signal generators are placed at any positions of the upper cover of the robot. Since the positions of the two positioning points are known, the position of the center point of the upper cover with respect to the two acoustic signal generators is also known, and the attitude of the robot is also known. At this time, when the robot is put into the storage tank, the positions of the two acoustic signal generators are determined by the positioning algorithm, and then the position and the attitude of the robot can be determined by the attitude calculation.

In the embodiment shown in FIG. 4, the positioning and attitude recognition module 2 consists of two acoustic signal generators 201 and four acoustic signal receivers 202 installed on the tank wall. The two acoustic signal generators 201 can be installed at the top of the support rod or at the bottom of the robot, and have the same height which can be adjusted as required. The embodiment of the robot in FIGS. 3A-3B is provided with three support rods, which are used to protrude the acoustic signal generators from the robot and prevent the robot from blocking signal transmission. The three support rods are designed to be foldable, which can be supported when in use and can be put down when not in use, which will not cause obstacles to the robot movement. Four acoustic signal receivers 202 are distributed in the circumferential distribution of the outer wall of the storage tank, and the heights of the four acoustic signal receivers 202 from the ground are equal to that of the acoustic signal generators 201. Four acoustic signal receivers 202 are evenly distributed in the circumferential direction of the outer wall of the storage tank. The three acoustic signal receivers 202 closest to the acoustic signal generator 201 are selected to position the acoustic source according to a three-point positioning method. The position and the attitude of the robot are confirmed by positioning the two acoustic signal generators 201. Specifically, the position of the robot is defined as the position of the center point of the rectangle of the upper cover of the robot. The two acoustic signal generators 201 are located on the axis of the symmetry axis of the long sides of the rectangle, and the distances from the center point are equal to each other. At this time, as long as the positions of the two acoustic signal generators 201 are acquired, the long side direction of the rectangle of the upper cover of the robot is determined by connecting the two acoustic signal generators as the movement direction of the robot. The midpoint of the connecting line can be calculated as the center of the rectangle, which is the position of the robot.

As shown in FIG. 4, if the center position of the connecting line of the positioning points of the two acoustic signal generators 201 can be confirmed as the position of the robot, the orientation (i.e. the movement direction) of the robot can be determined by the direction of the connecting line of the two positioning points, and the orientation of the robot is subject to the direction of the symmetry axis of the long sides. As shown in FIGS. 2A-2B and FIGS. 3A-3B, assuming that the connecting line of the two positioning points is not parallel to the symmetry axis of the long sides, the direction of the symmetry axis can also be obtained after determining the direction of the connecting line when the included angle between the connecting line of the two positioning points and the symmetry axis is known. In the embodiment shown in FIG. 4, the number of the acoustic signal receivers 202 is four, or three, five, six, seven or eight.

Figure 5:
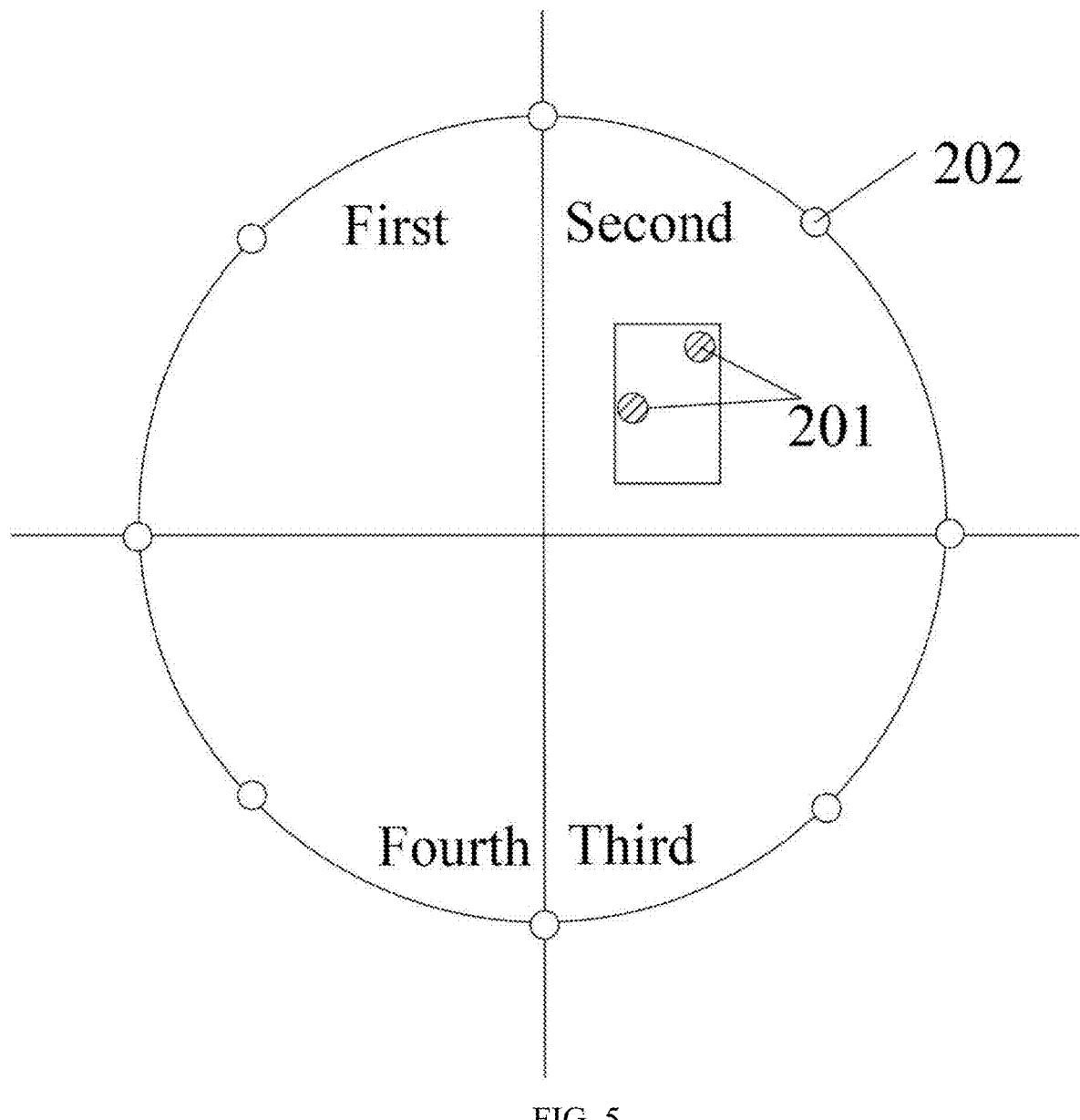
FIG. 5 is a schematic structural diagram of Embodiment 2 of a positioning and attitude recognition module.

FIG. 5 shows another arrangement of the acoustic signal generators 201 and the acoustic signal receivers 202 in the positioning and attitude recognition module 2, in which the center point of the connecting line between the two acoustic signal generators 201 is not the center position of the robot, and the direction of the connecting line is not parallel to the movement direction of the robot. The acoustic signal generators 201 are low-frequency pulse acoustic signal generators, which are installed on the robot. The signal frequency band is about 35 kHz. One of the acoustic signal generators 201 is located at the corner of one long side of the robot, and the other of the acoustic signal generators 201 is located at the midpoint of the other long side of the robot. Preferably, the acoustic signal generators 201 can be installed at the top of the erectable support rods, and the transmitted acoustic signals propagate in the circumferential direction in the horizontal plane of the storage medium; the acoustic signal generators 201 can also be installed at the bottom of the robot, the transmitted acoustic signals are transmitted vertically to the storage tank bottom plate, and the acoustic signals propagate in the circumferential direction of the storage tank bottom plate after entering the bottom plate.

The acoustic signal receivers 202 use low-frequency acoustic signal receivers, which are distributed in the circumferential direction of the outer wall of the storage tank. The heights of the acoustic signal receiver 202 from the ground are at the same heights as that of the acoustic signal generators 201. The number of the acoustic signal receivers 202 is at least three for positioning the acoustic signal source. Preferably, the number of the acoustic signal receivers 202 should be greater than eight as far as possible, so that at least three acoustic signal receivers 202 are covered in each quadrant formed at an angle of 90 degrees. In this way, when the robot is located in a certain quadrant, three adjacent acoustic signal receivers can be selected for positioning to avoid serious signal attenuation when the acoustic signals are transmitted to the remote receiver.

As shown in FIG. 5, when the number of acoustic signal receivers 202 is eight, so that at least three acoustic signal receivers 202 can be covered in each 90-degree quadrant in the first/second/third/fourth quadrant. During use, first, one of the acoustic signal generators 201 transmits a set of positioning pulses. After several milliseconds, each acoustic signal receiver 202 will receive a pulse signal successively. By calculating the time between peak values from the signals transmission to the pulse signals reception, the propagation distance of the acoustic signals can be calculated. According to the three-point positioning principle, the positioning point of the acoustic source can be calculated. After the positioning is completed, another acoustic signal generator 201 transmits positioning signals again, and the above process is repeated to calculate the positioning point of the second acoustic source. According to the coordinates of the two positioning points of the two acoustic signal generators 201, the orientation of the robot can be calculated.

As shown in FIG. 4, the obstacle avoidance module 3 includes pairs of acoustic signal generators and acoustic signal receivers, which are referred to as obstacle avoidance acoustic signal generators 301 and obstacle avoidance acoustic signal receivers 302, respectively. The obstacle avoidance acoustic signal generators 301 transmit acoustic signals in front of a traveling route of the robot. When the acoustic signals meet an obstacle and return, the returned acoustic signals are received by the obstacle avoidance acoustic signal receivers 302, and the distance of the obstacle is judged by a time difference between the transmission and reception of the acoustic signals. The traveling route of the robot is autonomously planned by the upper computer of the control module 5 or is controlled by an external remote controller to avoid obstacles. The obstacle avoidance module 3 operates continuously in the detection process.

The detection module 4 is usually located in the abdomen of the main body of the robot, and the included components are arranged as required. Specifically, the detection module 4 includes a detection component, a communication component and a detection control board.

The detection component includes a combination of one or more of a magnetic flux leakage detection sensor, an electromagnetic acoustic detection sensor, a guided wave detection sensor and a pulsed eddy current detection sensor. The detection component and the communication component are both connected with the detection control board. The detection control board is connected with the control module 5 via the communication component and is configured to transmit a detection result back to the control module 5.

When the number of sensors is greater than 1, all sensors are integrated through the detection control board. The detection control board is provided with a communication component for transmitting the detection result back to the control module 5 and then back to the upper computer. The detection control board is directly connected and communicated with the main control board of the control module 5. After sensors such as a magnetic flux leakage detection sensor, an electromagnetic acoustic detection sensor, a guided wave detection sensor and a pulsed eddy current detection sensor are integrated, there are the following relationships between these integrated sensors because of the mutual interference between permanent magnets and excitation coils: the magnetic flux leakage detection sensor can operate when the robot is moving; the electromagnetic acoustic detection sensor can operate when the robot is stationary or moving; the guided wave detection sensor can operate when the robot is stationary; the magnetic flux leakage detection sensor and the electromagnetic acoustic detection sensor can operate at the same time; the electromagnetic acoustic detection sensor and the guided wave detection sensor can operate at the same time; and the magnetic flux leakage detection sensor, the electromagnetic acoustic detection sensor, and the guided wave detection sensor cannot operate at the same time.

Guided wave detection excites and receives guided waves on the component through a magnetostrictive effect, and judges the defect position according to the defect echo. The defects are point defects, such as corrosion pits. Magnetic flux leakage detection measures the corrosion pit by measuring the leakage magnetic field at the defect. Electromagnetic acoustic detection excites and receives ultrasonic waves to measure the wall thickness under the joint action of a Lorentz force, a magnetization force and a magnetostrictive strain. When the pulsed eddy current detection sensor operates, other sensors need to stop operating. This is because other sensors are provided with permanent magnets and coils. In order to avoid electromagnetic interference, the pulsed eddy current can only operate alone to detect subsurface defects of materials, which mainly include uniform corrosion. Magnetic flux leakage detection and guided wave are mainly used to detect corrosion defects, mainly including point defects. Theoretically, the range of guided wave detection is larger than that of magnetic flux leakage detection. For example, the distance within 1 meter around falls within the detection range. Magnetic flux leakage detection can only detect the area directly below the sensor. The main function of electromagnetic acoustic detection and pulsed eddy current detection is to perform the thickness measurement, that is, to detect the uniform corrosion of the storage tank bottom plate. The difference between electromagnetic acoustic detection and pulsed eddy current detection is that the pulsed eddy current lift-off can be relatively large in theory, such as more than 100 mm, and the electromagnetic acoustic lift-off can be relatively small, such as a few millimeters. Therefore, when the oil sludge of the storage tank is up to a certain thickness, electromagnetic acoustic detection will not be able to detect the signals, and pulsed eddy current detection is needed to perform the thickness measurement.

The control module 5 includes a main control board and an upper computer. The upper computer controls the corresponding modules by sending commands to the main control board, or the upper computer control the modules by directly sending commands to the corresponding modules. For example, the motion module 1 is controlled by controlling the driving motor of the wheel set. The positioning and attitude recognition module 2 is controlled to be turned on or turned off by controlling the acoustic signal generators 201 and the acoustic signal receivers 202. The detection module 4 is controlled to be turned on or turned off by sending commands to the detection control board of the detection module 4. The dredging module 7 is controlled by controlling the motor of the dredging wheel. The positioning and attitude recognition module 2 needs to cooperate with the detection module 4 to acquire the position information corresponding to the detection result, and to complete attitude correction in the operating process of the robot.

Figure 6:
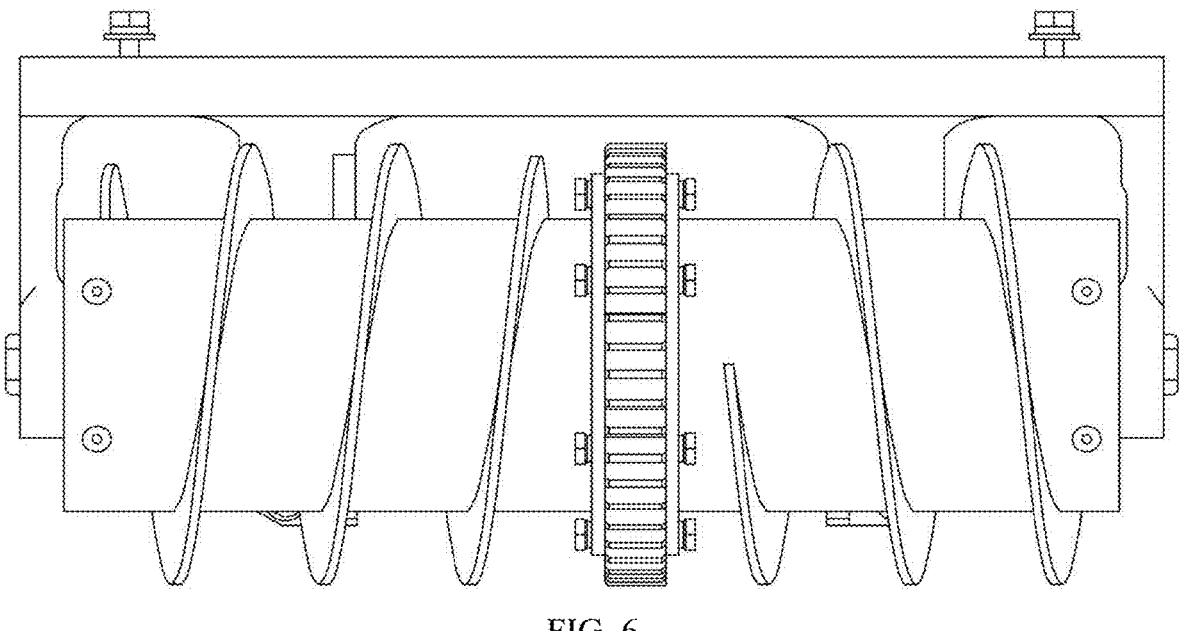
FIG. 6 is a schematic structural diagram of an embodiment of a dredging module.

As shown in FIGS. 3A-3B, the dredging module 7 is arranged in front of the movement direction of the robot. Because the oil sludge is usually thick and sticky, which hinders the movement of the robot, dredging wheels are arranged at both ends of the robot, which is beneficial to the movement of the robot. In some embodiments, as shown in FIG. 6, the structure of the dredging wheel is similar to that of a paddle wheel. The directions of the teeth of the wheel are bilaterally symmetric and are inclined towards the direction of the symmetry axis, and the inclination angle ranges from 5 degrees to 15 degrees. When operating, the dredging wheel rotates, and the cutting force of the teeth of the wheel is used to cut the oil sludge on the traveling route, the cut oil sludge is dredged by the rotation of the teeth of the wheel, and the bottom plate to be detected is exposed. The function of an ordinary wheel set is only to walk.

As shown in FIGS. 2A-2B and FIGS. 3A-3B, the control module 5 and the detection module 4 are generally placed in the inner space of the robot. The robot in the embodiment shown in FIGS. 2A-2B has the following characteristics. The motion module 1 is wheeled; the obstacle avoidance module 3 is only provided at the front end of the movement direction; the sensors of the positioning and attitude recognition module 2 are arranged to be diagonal; and the dredging module 7 is not included. The robot in the embodiment shown in FIGS. 3A-3B has the following characteristics. The motion module 1 is of a crawler type; the obstacle avoidance module 3 is only provided at the front end of the movement direction; the sensors of the positioning and attitude recognition module 2 are arranged at both sides of the robot; and the dredging wheel is included as the dredging module 7.

Based on the in-oil autonomous operation detection robot of the storage tank bottom plate, the present disclosure further provides an autonomous operation detection method, which includes the following steps S1 to S5.

S1, after the robot is put into the bottom plate by the retractable module 6, the control module 5 activates a positioning and attitude recognition module 2 to recognize a position and an attitude of the control module, and the position and the attitude at the start of the autonomous operation are adjusted to the predetermined position and attitude by controlling the motion module 1.

Before the robot enters the storage tank for detection, the priority detection position is determined and the attitude is determined through the tank drawings. The determination of the attitude refers to the direction of the head and the tail of the robot, which facilitates subsequent detection. Therefore, the predetermined position and attitude are determined according to the actual needs. After the robot is put into the bottom plate through the cable, because the cable is long and soft, the position where the robot arrives at the bottom may deviate from the predetermined position and attitude. Therefore, it is necessary to control the motion module 1 to move to the predetermined position and adjust the attitude through the movement of the wheels.

S2, the motion module 1 is controlled to allow the robot to move according to an autonomously pre-planned traveling route.

Figure 7:
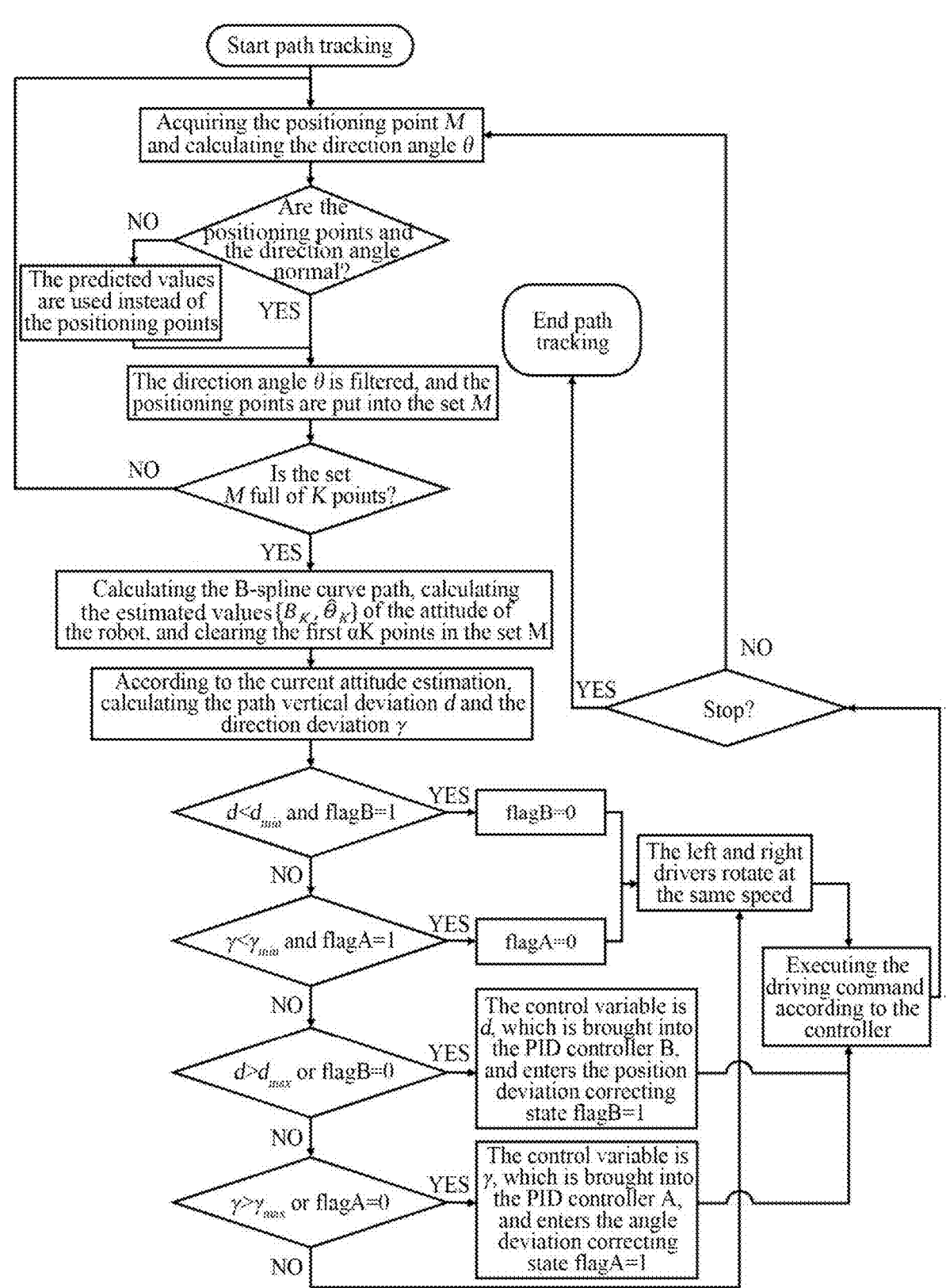
FIG. 7 is a flow chart of a path tracking algorithm stored in a control module.

The path tracking algorithm is stored in the control module 5, which can autonomously plan the traveling route of the robot, so that the motion module 1 is controlled to allow the robot to move according to an autonomously pre-planned traveling route. The flow chart of the path tracking algorithm is shown in FIG. 7. The state variables flagA and flagB are set to judge whether the robot is in the deviation correcting state. When the robot enters the deviation correcting state, the corresponding state is set to 1, and when the robot exits the deviation correcting state, the corresponding state is set to 0. The specific process of the path tracking algorithm is as the following S2.1 to S2.6.

S2.1, abnormal values are eliminated. At time $t_k$, the position coordinates of the robot itself are taken as the coordinates of one of the acoustic signal generators in the positioning and attitude recognition module 2, which are denoted as $M_k$. The direction angle is calculated by the included angle between the connecting line of two acoustic signal generators and the front of the robot and two front and rear positioning points of the two acoustic signal generators, which is denoted as $\theta_k$. The original values of the attitude (abbreviation for position and attitude) of the robot are denoted as $\{M_k, \theta_k\}$. At time $t_{k+1}$, if abnormal noise occurs, which may lead to the change of the position or the direction beyond the allowable values, the measured valued of the attitude at time $t_{k+1}$ are discarded, but the attitude at time $t_{k+1}$ is predicted by using the speed, the angular speed and the attitude at time $t_k$ instead, to obtain the predicted values $\{\tilde{M}_k+1, \hat{\theta}_{k+1}\}$ of the attitude. Otherwise, the attitude is updated.

S2.2, the direction angle is filtered. Because there are errors in the positioning points of the two before and after acoustic signal generators of the robot, a Kalman filter is used to reduce the errors of the direction angle of the robot. The estimated value of the direction angle is $\hat{\theta}_k$.

S2.3, the coordinates are filtered. On the two-dimensional plane, the motion trajectory of the coordinate points of the robot which was originally moving smoothly will oscillate and reciprocate due to the positioning errors. In order to eliminate the distortion of the motion trajectory, a piecewise fitting method is used. Straight line fitting is taken as an example. Every K points (abbreviation for positioning points) form a group to perform piecewise fitting. The coordinates form a set $M\{M_1, M_2, \ldots M_K\}$. The line segment $L_1$ defined in the range of point sets is obtained by a linear fitting formula. At this time, the robot coordinate is $M_K$, that is, k=K. The vertical line of $L_1$ is taken from point $M_K$, and the obtained intersection point is the estimated value $B_K$ of the current position of the robot. The estimated value of the attitude is $\{B_K, \hat{\theta}_K\}$.

S2.4, the path (or the route) is estimated. It is assumed that the path update scale coefficient is $\alpha$, the first rounded $\alpha K$ points in the setM are discarded, thereafter, (K-$\alpha$K) points are updated to obtain a new set $M'\{M_{\alpha K+1}, M_{\alpha K+2}, \ldots M_{\alpha K+K}\}$ to be fit to obtain the line segment $L_2$. There are point sets $B\{M_1, B_1, B_2, \ldots, B_P\}$, where $M_1$ and $B_P$ are the estimated values of the starting point and the current point. P+1 is the number of points in point set B. In order to allow the curve to be continuous and local, a B-spline curve is used to draw the motion trajectory of the robot, which is used to give the mapping of the detection data in the movement.

S2.5, command control is performed. The previous path point of the robot is denoted as T, and the target path point is T'. According to the geometric relationship, the vertical deviation d of the path between the current path point $B_K$ and the path TT' of the robot is calculated, and the direction deviation between the current direction and the path direction is $\gamma$. When the vertical deviation of the path is taken as the control variable, the position error of the robot is smaller, but the traveling direction of the robot is in the adjustment state for a long time. Therefore, the traveling route will oscillate around the path in a small amplitude, which is not conducive to full coverage detection. When the direction deviation is taken as the control variable, the traveling direction of the robot is more stable, but there is an accumulated error in position. Therefore, it is necessary to combine the two methods. It is assumed that $\gamma_{max}$ is the maximum allowable direction deviation, and $\gamma_{min}$ is the minimum allowable direction deviation. $d_{max}$ is the maximum allowable position error, and $d_{min}$ is the minimum allowable position error. When $\gamma < \gamma_{min}$ and $d < d_{min}$, the left and right drivers of the robot output the same rotational speed. When $\gamma > \gamma_{max}$ and $d < d_{min}$, the direction deviation is input into a Proportion Integration Differentiation (PID) controller A as a control variable to correct the movement direction of the robot, and the speed ratio of the left and right motors is proportional to the output of the controller until $\gamma < \gamma_{mmin}$. When $d > d_{max}$, the vertical deviation d of the path is input into PID controller B as a control variable until $d < d_{min}$.

S2.6, stop. If the coordinates of the robot are located in the circle in which the radius is the positioning error for many times in succession, it is judged that the robot has stopped due to manual operation or abnormal conditions, and path tracking stops.

Figures 8, 9:
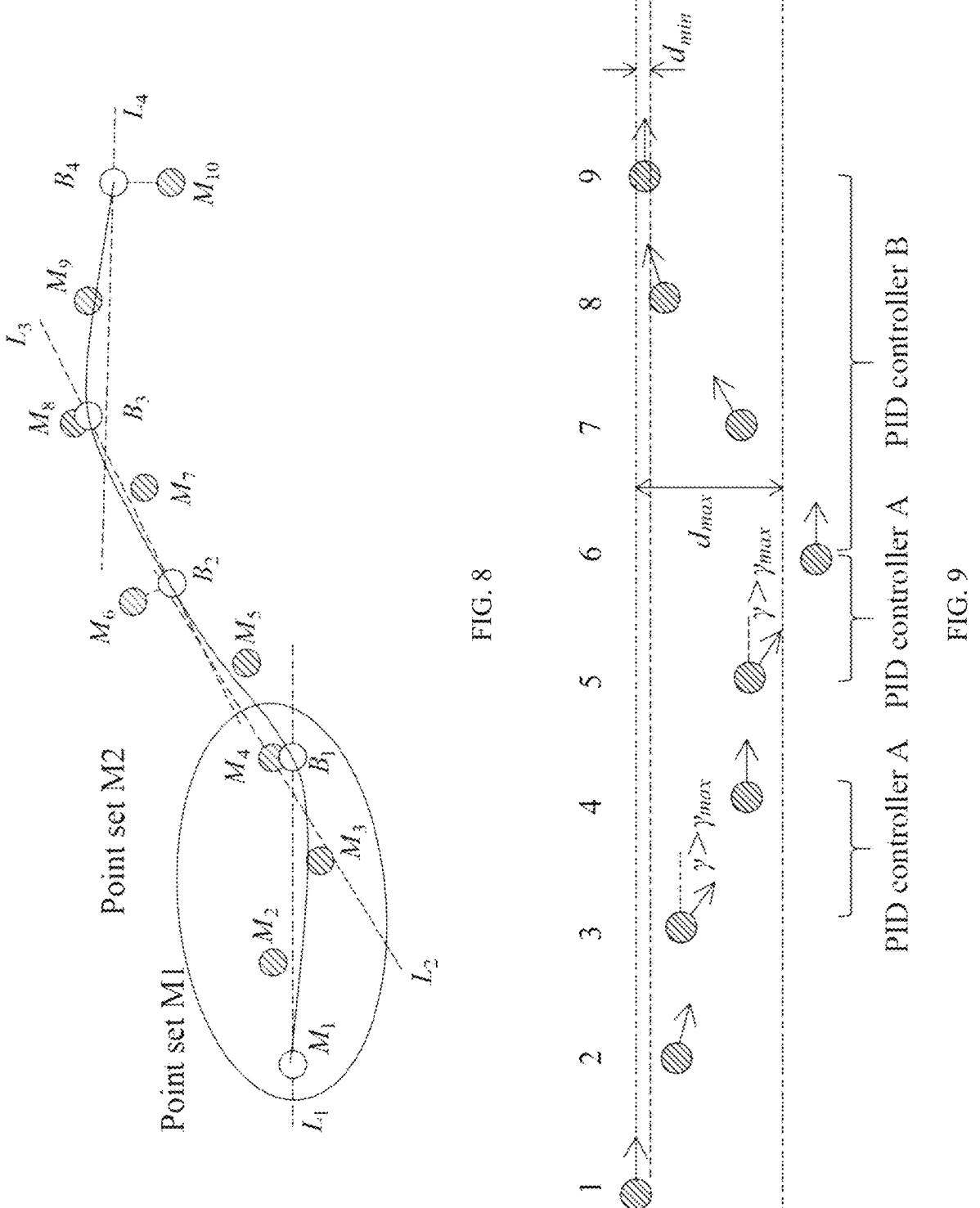
FIG. 8 is a schematic diagram of an example of coordinate filtering and trajectory estimation.
FIG. 9 is a schematic diagram of an example of command control.

The following two examples are explained specifically. FIG. 8 is an example of coordinate filtering and trajectory estimation. The number of points in the set is K=4, and the path update scale coefficient is $\alpha$=0.5. The point set M1 is $\{M_1, M_2, M_3, M_4\}$, and the straight line $L_1$ and the estimated point $B_1$ are obtained by fitting, in which the straight line $M_4B_1$ is perpendicular to $L_1$. Thereafter, the first two points in the point set M1 are cleared to obtain $\{M_3, M_4\}$. Continue to collect positioning points until a new point set M2$\{M_3, M_4, M_5, M_6\}$ is obtained, and $B_2$ is obtained by the same method. If the order of the B-spline curve is p=3, when k=8, the point set B$\{M_1, B_1, B_2, B_3\}$ is obtained, and the first B-spline curve can be obtained as the trajectory (i.e., the traveling route). When k=10, the second B-spline curve is obtained, and the line segment between $M_1$ and $B_1$ will not be updated due to locality.

FIG. 9 is an example of command control. The horizontal direction is the forward direction. It is assumed that the load on the right side of the robot is greater due to the uneven ground in the traveling area, which leads to the deviation to the right. The movement direction of the initial position 1 is directly forward. When arriving at position 2, the robot deviates to the right. At this time, $\gamma < \gamma_{min}$, and the left and right drivers continue to keep the same speed. When arriving at position 3, $\gamma > \gamma_{max}$, the PID controller A is activated to adjust the left and right drivers, and the right speed is increased. When arriving at position 4, $\gamma$ is corrected. At this time, $d < d_{min}$ and $\gamma < \gamma_{min}$, and the left and right drivers output the same speed. When arriving at position 5, $\gamma > \gamma_{max}$ occurs again, and the orientation continues to be corrected. When arriving at position 6, $d > d_{max}$, the PID controller B is activated to adjust the left and right drivers, and the speed of the right driver is increased to correct the position error. When arriving at positions 7 and 8, the robot starts to deviate to the left. When arriving at position 9, $d < d_{mi}$ and $\gamma < \gamma_{min}$, and the left and right drivers output the same speed.

S3, if the obstacle avoidance module 3 explores unexpected obstacles in the traveling process, the control module 5 plans an optimal route, and modifies the traveling route by controlling the motion module 1 to avoid obstacles. Specifically, the internal structure of the storage tank is acquired in advance through the storage tank processing drawing, and then the traveling route is planned autonomously. When encountering unexpected obstacles, the algorithm needs to be used to plan the optimal route to avoid obstacles and return to the original route.

S4, the detection module 4 is controlled to perform the required detection on the storage tank bottom plate in the traveling process, and meanwhile, a detection result is transmitted back, during which the positioning and attitude recognition module 2 continuously positions the robot to realize a one-to-one correspondence between the position information and the detection result. The detection of the bottom plate is determined according to the requirements. For example, if the thickness of the bottom plate needs to be detected, the electromagnetic acoustic detection can be used, and the returned detection result is the acoustic echo data. The types of data returned by different detection sensors are different, and different data are returned as detection results according to the characteristics of detection sensors. Generally, the original data is transmitted back to the upper computer through the main control board. The final data processing and result analysis are performed in the upper computer.

Figure 10:
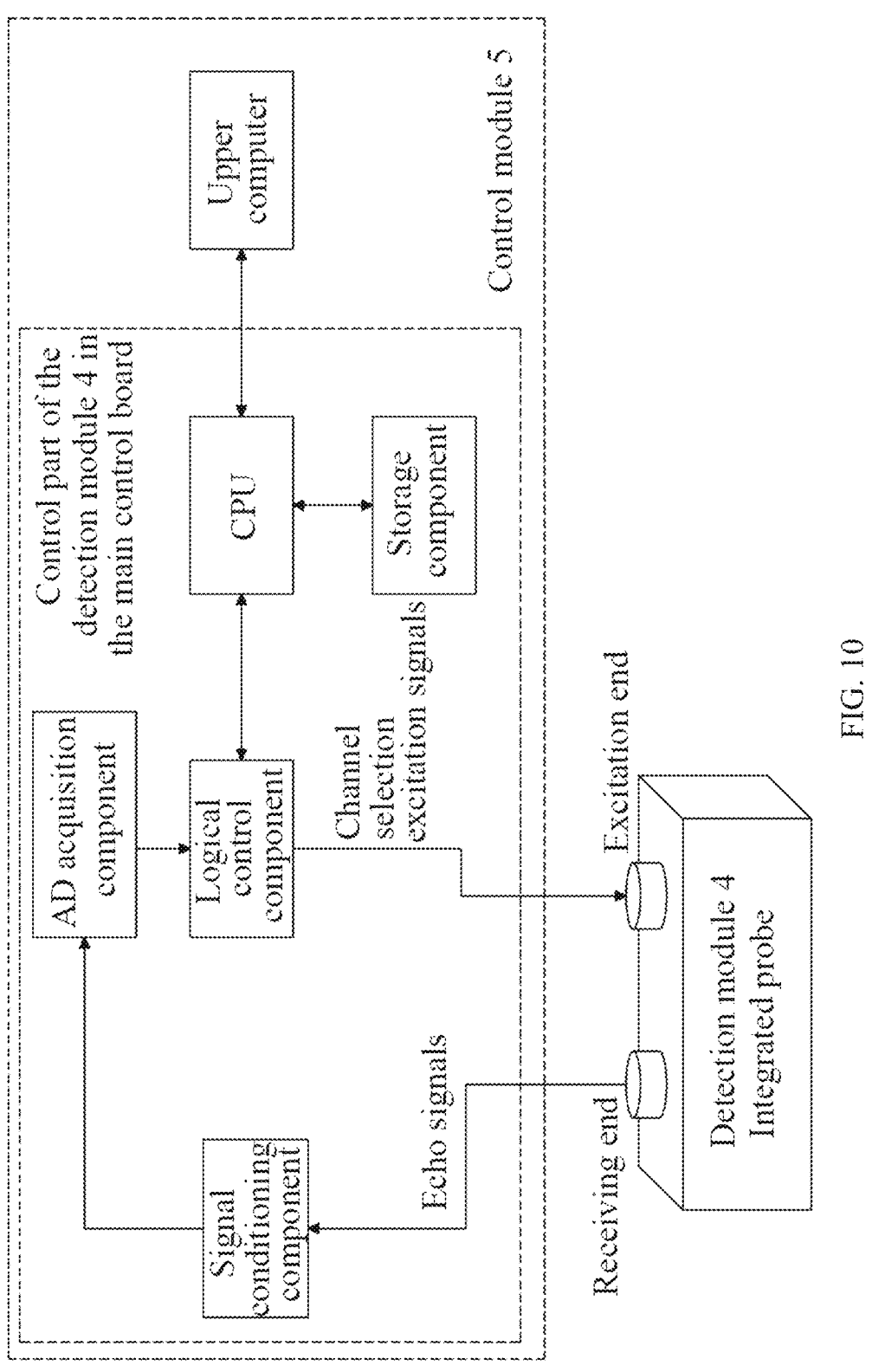
FIG. 10 is a schematic diagram of a cooperating process between a control module and a detection module.

As shown in FIG. 10, the cooperation between the control module 5 and the detection module 4 is as follows. The upper computer of the control module 5 selects different control channels through the logic control component, activates the excitation end of a sensor in the detection module

4 to transmit excitation signals, receives the echo signals through the receiving end of the integrated probe, uploads the echo signals to the signal conditioning component of the control module 5, collects the signals through the Analog-to-Digital (AD) acquisition component, uploads the collected signals to the Central Processing Unit (CPU) through the logic control component, and stores the signals by the storage component. The integrated probe is the main part of the detection module 4, and the receiving end is configured to receive signals. The signal conditioning component is located on the main control board. The logic control component is the core component on the main control board, which is configured to control other modules. The logic control module controls different sensors to perform different actions through different communication protocols sent by the upper computer. The excitation ends of different detection sensors are different. Some detection sensors have excitation ends, and some detection sensors do not have excitation ends. For example, magnetic flux leakage detection is passive detection without sending excitation signals. The acoustic detection, guided wave detection and pulsed eddy current detection have different excitation ends and different excitation signals. The upper computer sends an action command, which has been agreed as a control command of a sensor through the protocol. Through the judgment of the logic control component, the command is transmitted to the corresponding sensor, and the corresponding sensor performs the corresponding detection action according to the protocol after receiving the command. There are two types of detection actions, in which one type is passive detection, such as the above-mentioned magnetic flux leakage type, which starts to receive signals, and the other type is active detection, which needs to transmit excitation signals and then receive echoes.

If the integrated sensor is an integrated probe of magnetic flux leakage detection, electromagnetic acoustic detection, guided wave detection and pulsed eddy current detection, the detection process is as follows.

After the robot is adjusted to the predetermined position and attitude, the robot travels along the predetermined route. At this time, the magnetic flux leakage detection sensor and the electromagnetic acoustic detection sensor are turned on to perform magnetic flux leakage detection and electromagnetic acoustic thickness measurement, collect magnetic flux leakage detection signals and electromagnetic acoustic thickness measurement signals as a detection result, and transmit the detection result to the control module 5.

When the results of magnetic flux leakage detection and electromagnetic acoustic detection are transmitted back to the upper computer to show that there is no signal or a pitch angle measured by a gyroscope is greater than a threshold, the above two sensors are turned off at this time, a pulsed eddy current detection sensor is activated to perform pulsed eddy current thickness measurement, pulsed eddy current thickness measurement signals are collected as a detection result, and the detection result is transmitted to the control module 5. This is because when the lift-off is higher, the magnetic flux leakage detection method and electromagnetic acoustic detection method fail, while pulsed eddy current detection can perform thickness measurement under the condition of large lift-off. When the pitch angle is greater than the threshold, it means that the oil sludge is too thick, and the magnetic flux leakage data and the electromagnetic acoustic data may lead to missed detection or false detection. Therefore, it is necessary to activate the pulsed eddy current for further detection. The threshold of the pitch angle is set according to the actual detection situation.

At a specific position (in areas where defects are suspected and the robot cannot reach, such as some complex terrain areas or sheltered areas in the tank, a specific position is selected to stop the robot and activate guided wave detection) or when encountering an unexpected obstacle, a guided wave detection sensor is activated to perform single-point thickness measurement, other sensors are deactivated, guided wave detection signals are collected as a detection result, and the detection result is transmitted to the control module 5.

The upper computer of the control module 5 stores the original signals. The stored data can be used for data analysis and result processing immediately or reserved for such purposes later. The result of the single-point thickness measurement is to measure the thickness of the bottom plate directly below the detection module 4. By comparing the data from different periods or with the original thickness, it can be analyzed whether the bottom plate has thinned. Thinning means that corrosion has occurred. Different detection methods have different detection advantages. The detection results obtained by different detection methods are also different for the same sample to be detected. The detection results obtained by different detection methods support each other, and finally a reliable detection conclusion is obtained, so that the corrosion of the bottom plate in the invisible environment of large oil sludge can be detected, and the detection accuracy can be improved.

S5, the detection task is completed, and the robot returns to an initial position according to a set traveling route by controlling the motion module 1, that is, the predetermined position before the detection is started.

According to the in-oil autonomous operation detection robot of the storage tank bottom plate and the autonomous operation detection method provided by the present disclosure, a motion module, a positioning and attitude recognition module, an obstacle avoidance module, a retractable module and a dredging module which are matched with the detection capability are arranged, which achieves the purpose of in-oil autonomous operation detection in the invisible environment of large oil sludge, has the characteristics of being low in cost, high in efficiency, short in time consumption, pollution-free, and good in timeliness, and greatly facilitates the operation and maintenance of the storage tank.

In the present disclosure, specific examples are used to illustrate the principle and the implementation of the present disclosure. The description of the above embodiments is only used to help understand the method and the core idea of the present disclosure. At the same time, for those skilled in the art, there will be changes in the detailed description and the application scope according to the idea of the present disclosure. In summary, the contents of this specification should not be construed as limiting the present disclosure.

What is claimed is:

1. An in-oil autonomous operation detection robot of a storage tank bottom plate, wherein the in-oil autonomous operation detection robot of the storage tank bottom plate comprises a motion module, a positioning and attitude recognition module, an obstacle avoidance module, a detection module, a control module and a dredging module; wherein the control module is connected with the motion module, the positioning and attitude recognition module, the obstacle avoidance module, the dredging module and the detection module, respectively;

the motion module is configured to adjust and control a motion direction, a speed and an attitude of the robot under a control of the control module;

the positioning and attitude recognition module is configured to recognize a position and the attitude of the robot under the control of the control module;

the obstacle avoidance module is configured to avoid obstacles under the control of the control module; and the detection module is configured to detect corrosions of the bottom plate under the control of the control module; the detection module comprises a detection component, a communication component and a detection control board; the detection component comprises a combination of one or more of a magnetic flux leakage detection sensor, an electromagnetic acoustic detection sensor, a guided wave detection sensor and a pulsed eddy current detection sensor; the detection component and the communication component are both connected with the detection control board; the detection control board is connected with the control module via the communication component and is configured to transmit a detection result back to the control module;

wherein the control module is configured to activate the positioning and attitude recognition module to recognize the position and the attitude of the robot, control the motion module to adjust the position and the attitude at a start of the autonomous operation to a predetermined position and attitude and allow the robot to move according to an autonomously pre-planned traveling route;

when the obstacle avoidance module explores unexpected obstacles in a traveling process, the control module is further configured to plan an optimal route, and control the motion module to modify the traveling route to avoid obstacles;

wherein, the control module is further configured to control the detection module to perform a required detection on the storage tank bottom plate in the traveling process, and meanwhile, transmit a detection result back, during which the positioning and attitude recognition module continuously positions the robot to realize a one-to-one correspondence between position information and the detection result;

wherein, the control module is further configured to control the motion module return the robot to an initial position according to a set traveling route, after a detection task is completed;

wherein the positioning and attitude recognition module comprises acoustic signal generators installed on the robot, acoustic signal receivers installed on a tank wall and a gyroscope placed inside the robot; the positioning and attitude recognition module determines the position and a horizontal attitude of the robot via a robot positioning and attitude algorithm based on transmitted and received acoustic signals, and calculates a pitch attitude of the robot based on the gyroscope;

the motion module comprises a wheel set and a driving motor;

the obstacle avoidance module comprises pairs of acoustic signal generator and acoustic signal receiver;

the control module comprises an upper computer and a main control board which are connected with each other; and the dredging module comprises dredging wheels arranged at both ends of the robot and is configured to cut oil sludge on a traveling route to expose the bottom plate to be detected;

wherein, a path tracking algorithm is stored in the control module, wherein, at time $t_k$, position coordinates of the robot itself are taken as coordinates of one of the acoustic signal generators in the positioning and attitude recognition module, which are denoted as $M_k$; a direction angle is calculated by an included angle between a connecting line of two acoustic signal generators and a front of the robot, and two front and rear positioning points of the two acoustic signal generators, which is denoted as $\theta_k$; original values of an attitude of the robot are denoted as $\{M_k, \theta_k\}$; at time $t_{k+1}$, if abnormal noise occurs, which leads to a change of a position or a direction beyond allowable values, measured values of the attitude are discarded, but the attitude at time $t_{k+1}$ is predicted by using a speed, an angular speed and the attitude at the time $t_k$ instead, to obtain predicted values $\{\tilde{M}_{k+1}, \hat{\theta}_{k+1}\}$ of the attitude; otherwise, the attitude is updated;

considering that there are errors in the positioning points of the two front and rear acoustic signal generators of the robot, a Kalman filter is used to reduce errors of the direction angle of the robot; an estimated value of the direction angle is $\hat{\theta}_k$;

in order to eliminate distortion of a motion trajectory, a piecewise fitting method is used; every K points form a group to perform piecewise fitting; coordinates form a set $M\{M_1, M_2, \ldots M_K\}$; a line segment $L_1$ defined in a range of point set is obtained by a linear fitting formula; at this time, a robot coordinate is $M_K$, that is, k=K; a vertical line of $L_1$ is taken from point $M_K$, and an obtained intersection point is an estimated value $B_K$ of current position of the robot; estimated values of the attitude is $\{B_K, \hat{\theta}_K\}$;

a path update scale coefficient is assumed to be $\alpha$, first rounded $\alpha K$ points in the set M are discarded, thereafter, (K-$\alpha$K) points are updated to obtain a new set $M'\{M_{\alpha K+1}, M_{\alpha K+2}, \ldots M_{\alpha K+K}\}$ to be fit to obtain a line segment $L_2$; wherein, for a point set $B\{M_1, B_1, B_2, \ldots, B_P\}$, $M_1$ and $B_P$ are estimated values of starting point and current point; P+1 is a number of points in the point set B; in order to allow a curve to be continuous and local, a B-spline curve is used to draw the motion trajectory of the robot, which is used to give a mapping of detection data in a movement;

a previous path point of the robot is denoted as T, and a target path point is T'; according to a geometric relationship, a vertical deviation d of a path between a current path point $B_K$ and a path TT' of the robot is calculated, and a direction deviation between a current direction and a path direction is $\gamma$; it is assumed that $\gamma_{max}$ is a maximum allowable direction deviation, and $\gamma_{min}$ is a minimum allowable direction deviation; $d_{max}$ is a maximum allowable position error, and $d_{min}$ is a minimum allowable position error; when $\gamma < \gamma_{min}$ and $d < d_{min}$, left and right drivers of the robot output a same rotational speed; when $\gamma > \gamma_{max}$, and $d < d_{min}$, the direction deviation $\gamma$ is input into a Proportion Integration Differentiation (PID) controller A as a control variable to correct a movement direction of the robot, and a speed ratio of left and right motors is proportional to an output of the controller until $\gamma < \gamma_{min}$; when $d > d_{max}$, the vertical deviation d of the path is input into PID controller B as a control variable until $d < d_{min}$;

if the coordinates of the robot are located in a circle in which a radius is a positioning error for many times in succession, it is judged that the robot has stopped due to manual operation or abnormal conditions, and path tracking stops.

2. The in-oil autonomous operation detection robot of the storage tank bottom plate according to claim 1, wherein the wheel set is installed at both sides of long rectangular sides of the robot and comprises a combination of one or more of a crawler type, universal wheels and Mecanum wheels; a main shaft of the wheel set is connected with the driving motor, and the wheel set is controlled by a rotation of the driving motor to adjust and control the motion direction, the speed and the attitude of the robot; the driving motor is connected with a main control board of the control module, and the main control board is controlled by an external remote controller or by an upper computer of the control module.

3. The in-oil autonomous operation detection robot of the storage tank bottom plate according to claim 1, wherein a number of the acoustic signal receivers installed on the tank wall is more than eight, at least three acoustic signal receivers are covered in each quadrant formed at an angle of 90 degrees in a circumferential direction of the tank wall, and when the robot is located in a certain quadrant, three adjacent acoustic signal receivers are used for positioning.

4. The in-oil autonomous operation detection robot of the storage tank bottom plate according to claim 1, wherein the acoustic signal generator transmits acoustic signals in front of a traveling route of the robot, and when the acoustic signals meet an obstacle and returns, returned signals are received by the signal receiver, and a distance of the obstacle is judged by a time difference between transmission and reception of acoustic signals; the traveling route of the robot is autonomously planned by an upper computer of the control module or is controlled by an external remote controller to avoid obstacles.

5. The in-oil autonomous operation detection robot of the storage tank bottom plate according to claim 1, wherein in the traveling process, the control module turns on the magnetic flux leakage detection sensor and the electromagnetic acoustic detection sensor to perform magnetic flux leakage detection and electromagnetic acoustic thickness measurement to collect magnetic flux leakage detection signals and electromagnetic acoustic thickness measurement signals as a detection result and transmit the detection result to the control module;

when results of the magnetic flux leakage detection and the electromagnetic acoustic detection are transmitted back to the control module to show that there is no signals or a pitch angle measured by the gyroscope is greater than a threshold, the control module turns off the magnetic flux leakage detection sensor and the electromagnetic acoustic detection sensor, activates the pulsed eddy current detection sensor to perform pulsed eddy current thickness measurement to collect pulsed eddy current thickness measurement signals as a detection result and transmit the detection result to the control module; and at a specific position or when encountering an unexpected obstacle, the control module activates the guided wave detection sensor to perform single-point thickness measurement and deactivates other sensors to collect guided wave detection signals as a detection result, and transmit the detection result to the control module.

* * * * *